(12) United States Patent
Hays et al.

(10) Patent No.: US 10,093,168 B2
(45) Date of Patent: Oct. 9, 2018

(54) MULTI-WHEEL TRANSMISSION

(71) Applicant: Orbis Wheels, Inc., Mill Valley, CA (US)

(72) Inventors: Marcus G. Hays, San Rafael, CA (US); Gary Leo, Fairfax, CA (US); Scott Streeter, Santa Rosa, CA (US)

(73) Assignee: ORBIS WHEELS, INC., Mill Valley, CA (US)

( * ) Notice: Subject to any disclaimer, the term of this patent is extended or adjusted under 35 U.S.C. 154(b) by 0 days.

(21) Appl. No.: 15/642,302

(22) Filed: Jul. 5, 2017

(65) Prior Publication Data

US 2018/0009311 A1  Jan. 11, 2018

Related U.S. Application Data (60) Provisional application No. 62/358,443, filed on Jul. 5, 2016.

(51) Int. Cl.
  *B60K 7/00* (2006.01)
  *B60K 17/04* (2006.01)
  *B60G 7/00* (2006.01)
  *F16H 1/10* (2006.01)
  *F16H 13/04* (2006.01)

(52) U.S. Cl.
  CPC ............ *B60K 7/0007* (2013.01); *B60G 7/006* (2013.01); *B60K 17/043* (2013.01); *F16H 1/10* (2013.01); *F16H 13/04* (2013.01); *B60K 2007/0038* (2013.01); *B60K 2007/0061* (2013.01)

(58) Field of Classification Search
  CPC ................. B60K 7/007; B60K 17/043; B60K 2007/0061; B60K 2007/0038; B60K 7/0007
  See application file for complete search history.

(56) References Cited

U.S. PATENT DOCUMENTS

| | | | | |
|---|---|---|---|---|
| 1,819,924 A | * | 8/1931 | Seppola | B60K 17/043 180/10 |
| 2,733,771 A | | 2/1956 | Sullivan | |
| 3,186,506 A | | 6/1965 | Leach et al. | |
| 3,380,546 A | * | 4/1968 | Rabjohn | B60L 11/1805 180/15 |
| 3,752,331 A | | 8/1973 | Colburn | |
| 5,036,941 A | | 8/1991 | Denzin et al. | |

(Continued)

OTHER PUBLICATIONS

International Search Report dated Sep. 8, 2017 as received in Application No. PCT/US2017/040780.

(Continued)

*Primary Examiner* — Brian L Swenson
(74) *Attorney, Agent, or Firm* — Maschoff Brennan (57) ABSTRACT

The present disclosure includes a transmission comprising a first wheel assembly including a first wheel, a first drive gear coupled to the first wheel such that driving the first drive gear causes a corresponding rotation of the first wheel, and a first motor coupled to the first drive gear to drive the first drive gear. The transmission also includes a second wheel assembly that includes, a second wheel, a second drive gear coupled to the second wheel such that driving the second drive gear causes a corresponding rotation of the second wheel, and a second motor coupled to the second drive gear to drive the second drive gear.

5 Claims, 10 Drawing Sheets

(56) References Cited

U.S. PATENT DOCUMENTS

| | | | | |
|---|---|---|---|---|
| 5,105,915 | A * | 4/1992 | Gary | A61G 3/063 14/71.3 |
| 6,112,843 | A * | 9/2000 | Wilcox | B60K 17/36 180/209 |
| 7,803,085 | B2 * | 9/2010 | Himmelmann | B60K 7/0007 180/371 |
| 8,839,891 | B2 * | 9/2014 | Kaloust | B62D 1/283 180/6.2 |
| 8,950,762 | B2 * | 2/2015 | Song | B60G 3/145 180/24.02 |
| 2003/0183034 | A1 | 10/2003 | Yang | |
| 2004/0163869 | A1 * | 8/2004 | Chun | B60K 7/0007 180/209 |
| 2005/0023056 | A1 * | 2/2005 | Harrup | B60K 7/0007 180/65.6 |
| 2006/0228201 | A1 * | 10/2006 | Lenceski | A63B 71/0036 414/466 |
| 2008/0230284 | A1 * | 9/2008 | Schoon | B60K 1/02 180/6.5 |
| 2014/0152076 | A1 * | 6/2014 | Vogler | B60K 7/0007 301/6.5 |
| 2016/0244948 | A1 * | 8/2016 | Rauma | B60K 6/46 |

OTHER PUBLICATIONS

Written Opinion of the International Searching Authority dated Sep. 8, 2017 as received in Application No. PCT/US2017/040780.

\* cited by examiner

MULTI-WHEEL TRANSMISSION

CROSS-REFERENCE TO RELATED APPLICATION

This application claims the benefit of U.S. Provisional Application No. 62/358,443, filed on Jul. 5, 2016, which is incorporated herein by reference in its entirety.

FIELD

The embodiments discussed in the present disclosure relate to a multi-wheel transmission.

The subject matter claimed in the present disclosure is not limited to embodiments that solve any disadvantages or that operate only in environments such as those described above. Rather, this statement is only provided to illustrate one example technology area where some embodiments described may be practiced.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to a multi-wheel transmission. Using a drive gear applied near the circumference of a wheel, the drive gear uses the wheel itself as a gear. In doing so, by varying the size of the drive gear and/or the wheel itself the gearing ratio may be modified. In some embodiments, multiple wheels may be used for a vehicle, each with a different gearing ratio. By using independently powered wheels with different gear ratios, a multi-speed transmission may be achieved. For example, a first wheel assembly with a first gearing ratio with high torque but lower speed may be used as a "low" gear and a second wheel assembly with a second gearing ratio with lower torque but higher speed may be used as a "high" gear.

The present disclosure relates to a vehicle with an adjustable height body. In these and other embodiments, a scissor-lift or other extendible member may be disposed between the wheel and the body of the vehicle such that as the scissor-lift is actuated (e.g., hydraulically), the body of the vehicle may be raised or lowered. The scissor lift may be coupled to an exoskeleton plate of the wheel. For example, the wheel may operate as a centerless wheel. In some embodiments, such a centerless wheel may include one or more generally circular exoskeleton plates located proximate a centerless rim of the centerless wheel. The exoskeleton plates may support one or more roller guide assemblies. The roller guide assemblies may include a bridging shaft that spans between the exoskeleton plates and functions as an axle for a roller guide of the roller guide assembly (e.g., by being fixed to each of the exoskeleton plates so the roller guide may rotate around the bridging shaft). The roller guide may be shaped and configured to roll along the centerless rim, either continually during use or under protective circumstances (e.g., when the centerless wheel assembly hits a pothole). In some embodiments, one or more of the roller guides may operate based on static friction between the roller guide and the centerless rim. Because the exoskeleton plate remains fixed relative to the body of the vehicle while the wheel is rotating in motion, the scissor lift may be coupled to an inside exoskeleton plate and remain operable while the vehicle is in motion.

Some embodiments of centerless wheel assemblies described in the present disclosure may have one or more of the following advantages: simplicity, low weight, low cost, low rotational friction, stable thermal properties, aerodynamic, and improved gear efficiencies. Centerless wheel assemblies in accordance with one or more embodiments may be used on any number of vehicles or transportation devices, including, for example, vehicles with any number of wheels, self-propelled vehicles, manually powered vehicles, motorized vehicles, mobility-aiding vehicles, cars, wheelchairs, etc. The centerless wheel assemblies may be used to transport people and/or goods. The centerless wheel assemblies may be similar to and/or share certain characteristics with the centerless wheel assemblies described in U.S. application Ser. No. 15/146,729, hereby incorporated by reference in its entirety.

Embodiments of the present disclosure are explained with reference to the accompanying drawings.

Figure 1:
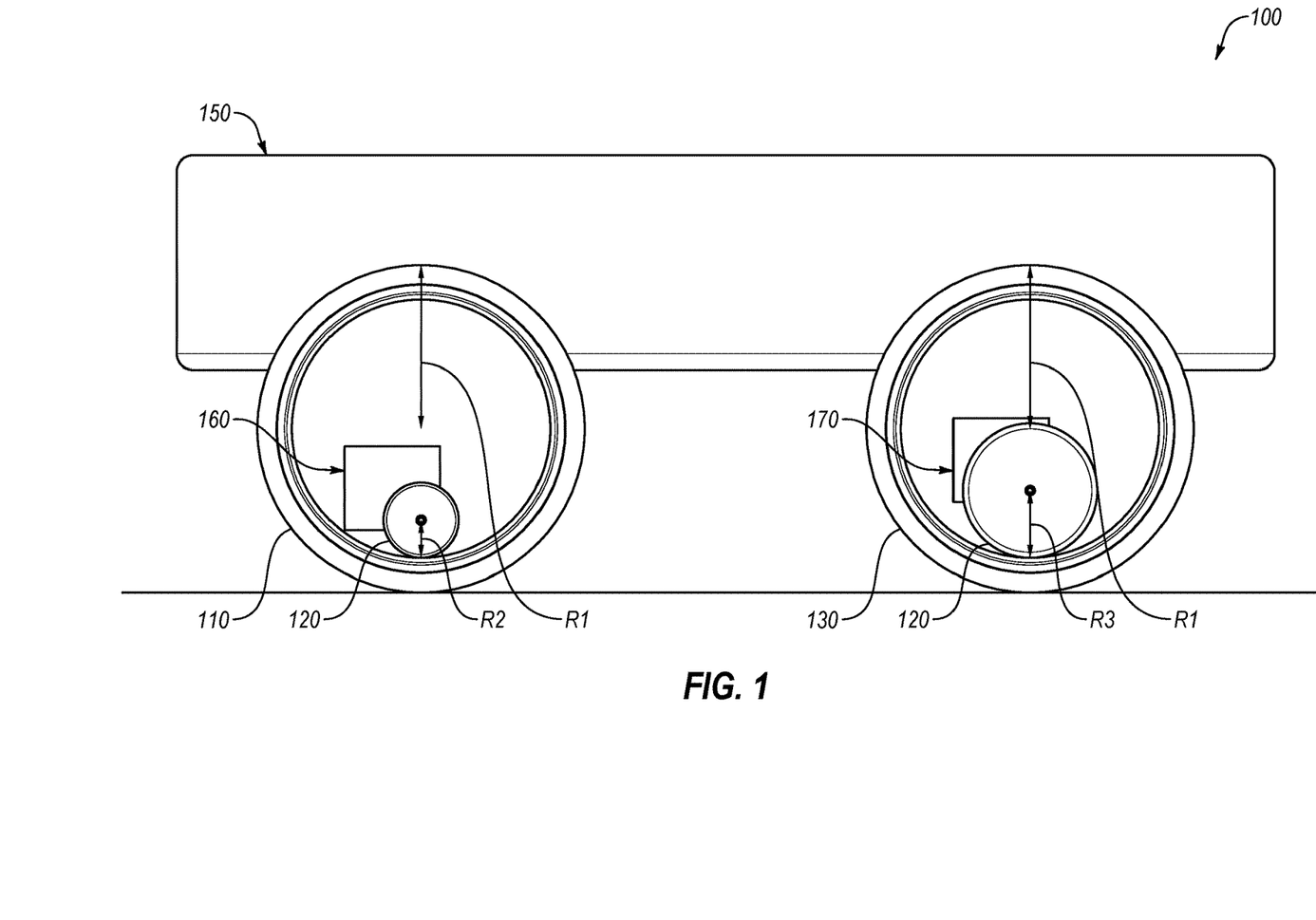
FIG. 1 illustrates a view of an example vehicle.

FIG. 1 illustrates a view of an example vehicle 100, in accordance with one or more embodiments of the present disclosure. As illustrated in FIG. 1, the vehicle 100 may include a first wheel 110 with a first drive gear 120. The first wheel 110 may include a first radius (R1) and the first drive gear 120 may include a second radius (R2). The vehicle 100 may include a second wheel 130 with a second drive gear 140. The second wheel may include the first radius (R1) and the second drive gear 140 may include a third radius (R3).

In determining the torque output, and comparing that torque output to a traditional wheel, the following calculations may be used. Mathematically:

Torque=Force×Distance from Center of Rotation, correspondingly, $$Force = \frac{Torque}{Distance}.$$

For a traditional wheel of radius R1 (e.g., a traditional wheel the same size as the first wheel 110), the Resultant Force (F1) (e.g., the force experienced at the rim of the tire or the force at the road surface) equals the torque applied about the axis of rotation (T1) (e.g., at the axle of the traditional wheel) divided by the lever length, which is R1, or $$F1 = \frac{T1}{R1}.$$

For the first wheel 110, Resultant Force (F2) at the rim of the tire, i.e., the force at the road surface equals the Output Torque (T2) (e.g., the torque about the axis of rotation for the first wheel 110) divided by the Lever Length (R1), where the Output Torque (T2) equals the gearing ratio of the output gear (the rim of the tire with radius R1) to the input gear (the first drive gear 120 with radius R2) multiplied by the Applied Torque (T3) (e.g., the torque applied at the first drive gear 120), or $$F2 = \frac{T2}{R1}$$

where $$T2 = T3 * \left(\frac{R1}{R2}\right)$$

or $$F2 = T3 * \left(\frac{R1}{R2}\right) / R1$$

Thus, if the wheels are the same size and the same torque is applied as an input (T1=T2), the first wheel 110 has a much larger force (by a factor of $$\frac{R1}{R2})$$

at the road surface when compared to a traditional wheel. Because of gearing ratio, small gears driving large gears result in a torque increase. In the case of the first wheel 110, this equates to a larger effective force at the edge of the first wheel 110.

In like manner, when computing the output force for the second wheel 130, the same calculations are applicable. However, instead of using the second driving gear 120 with radius R2, the driving gear 140 is used with radius R3. Thus, the Resultant Force (F3) for the second wheel 130 equals the Output Torque (T4) (e.g., the torque about the axis of rotation for the second wheel 130) divided by the Lever Length (R1), where the Output Torque (T4) equals the gearing ratio of the output gear (the rim of the tire with radius R1) to the input gear (the second drive gear 140 with radius R3) multiplied by the Applied Torque (T5) (e.g., the torque applied at the second drive gear 140), or $$F3 = \frac{T4}{R1}$$

where $$T4 = T5 * \left(\frac{R1}{R3}\right)$$

or $$F3 = T5 * \left(\frac{R1}{R3}\right) / R1$$

Thus, if the wheels are the same size and the same torque is applied as an input (T2=T4), the resultant Force F3 is smaller for the second wheel 130 because R3>R2. However, because R3>R2, one rotation of the second drive gear 140 drives the second wheel 130 a further distance than one rotation of the first drive gear 120 drives the first wheel 110. By using the different sizes of drive gears in the wheels of the vehicle 100 (e.g., by using the first drive gear 120 and the second drive gear 140), a two stage transmission may be implemented such that the first wheel 110 is a first stage of a transmission with lower speed and higher torque, and the second wheel 130 is a second stage of the transmission with higher speed and lower torque. In these and other embodiments, the first wheel 110 may be used to start the vehicle and/or for low speeds, and the second wheel 120 may be used to maintain the vehicle 100 at higher speeds.

The vehicle 100 may include a body 150. The body 150 may represent any type of vehicle that may utilize the first wheel 110 the second wheel 130 and the associated transmission via the first wheel 110 and the second wheel 130. For example, the body 150 may include that of a bicycle, a scooter, an electric bicycle, an electric scooter, a car, a truck, a wheelchair, a trailer, a cart, a self-propelled vehicle, a robot, a wheelbarrow, etc. Certain modifications may be included to implement the first wheel 110 and the second wheel 130 in the various embodiments. For example, when the body 150 includes a wheelchair, the first wheel 110 may be on one side of the wheelchair and the second wheel 130 may be on the other side of the wheelchair, rather than a forward and backward configuration as illustrated in FIG. 1.

In some embodiments, the first wheel 110 may be driven by a first motor 160. In these and other embodiments, the second wheel 130 may be driven by a second motor 170. For example, the first motor 160 may have an output shaft coupled to the first drive gear 120 such that as the output shaft of the first motor 160 is rotated, a corresponding rotation of the first drive gear 120 occurs. Similarly, the second motor 170 may have an output shaft coupled to the second drive gear 140 such that as the output shaft of the second motor 170 is rotated, a corresponding rotation of the second drive gear 140 occurs.

In some embodiments, the first motor 160 and the second motor 170 may be wound in a certain way to be optimized for a certain speed. For example, based on a variety of factors, including the gearing ratio, the purpose of the vehicle 100, the properties of the motor, etc., the first motor 160 may be wound to optimize or otherwise improve the role of the first wheel 110 as the "low" gear in the transmission and the second motor 170 may be wound to optimize or otherwise improve the role of the second wheel 130 as the "high" gear in the transmission. For example, the first motor 160 may be wound to rotate most efficiently at a lower speed than the second motor 170. In some embodiments, different types and/or sizes of motors may be selected between the first motor 160 and the second motor 170.

The first motor 160 and/or the second motor 170 may include any source of motive power. For example, the first motor 160 and/or the second motor 170 may include an electric motor such as a direct current (DC) motor, an alternating current (AC) motor, a brush motor, a brushless motor, a shunt wound motor, a separately excited motor, a series wound motor, a compound wound motor, a permanent magnet motor, a servomotor, an induction motor, a synchronous motor, a linear induction motor, a synchronous linear motor, etc. As another example, the first motor 160 and/or the second motor 170 may include a fuel consuming engine, such as a four stroke engine, a diesel engine, a two stroke engine, a Wankel engine, an Atkinson engine, a gnome rotary engine, etc. In some embodiments, the first motor 160 and/or the second motor 170 may include a small, high-speed, high-efficiency DC electric motor that may rotate at speeds greater than six thousand rotations per minute (RPM). In these and other embodiments, the use of such a small motor may be available because of the gearing ratio from the first drive gear 120 to the first wheel 110 and/or the second drive gear 140 to the second wheel 130. As an additional example, the first motor 160 and/or the second motor 170 may include a human-powered motive device, such as bicycle pedals, arm cranks, ratcheting levers, etc.

A gear ratio of the first drive gear 120 to the first wheel 110 and/or the second drive gear 140 to the second wheel 130 may be larger than is possible within a single stage of reduction in the case of a conventional wheel. For example, the ratio may include between approximately five to one and approximately one hundred and twenty-five to one. This gearing advantage of the vehicle 100 may facilitate additional economies of weight and space saving via adaption to a more dimensionally compact motor (e.g., a brushless electric motor), which may otherwise, due to its small size and/or high RPM, provide insufficient torque for a conventional wheel. The gearing advantage of the vehicle 100 may also decrease one or more of the following: the amount of current or power necessary for the vehicle 100 to overcome inertia, resistive losses, and the operating temperature of the first motor 160 and/or the second motor 170, such that efficiency of the vehicle 100 may be improved.

Figure 6:
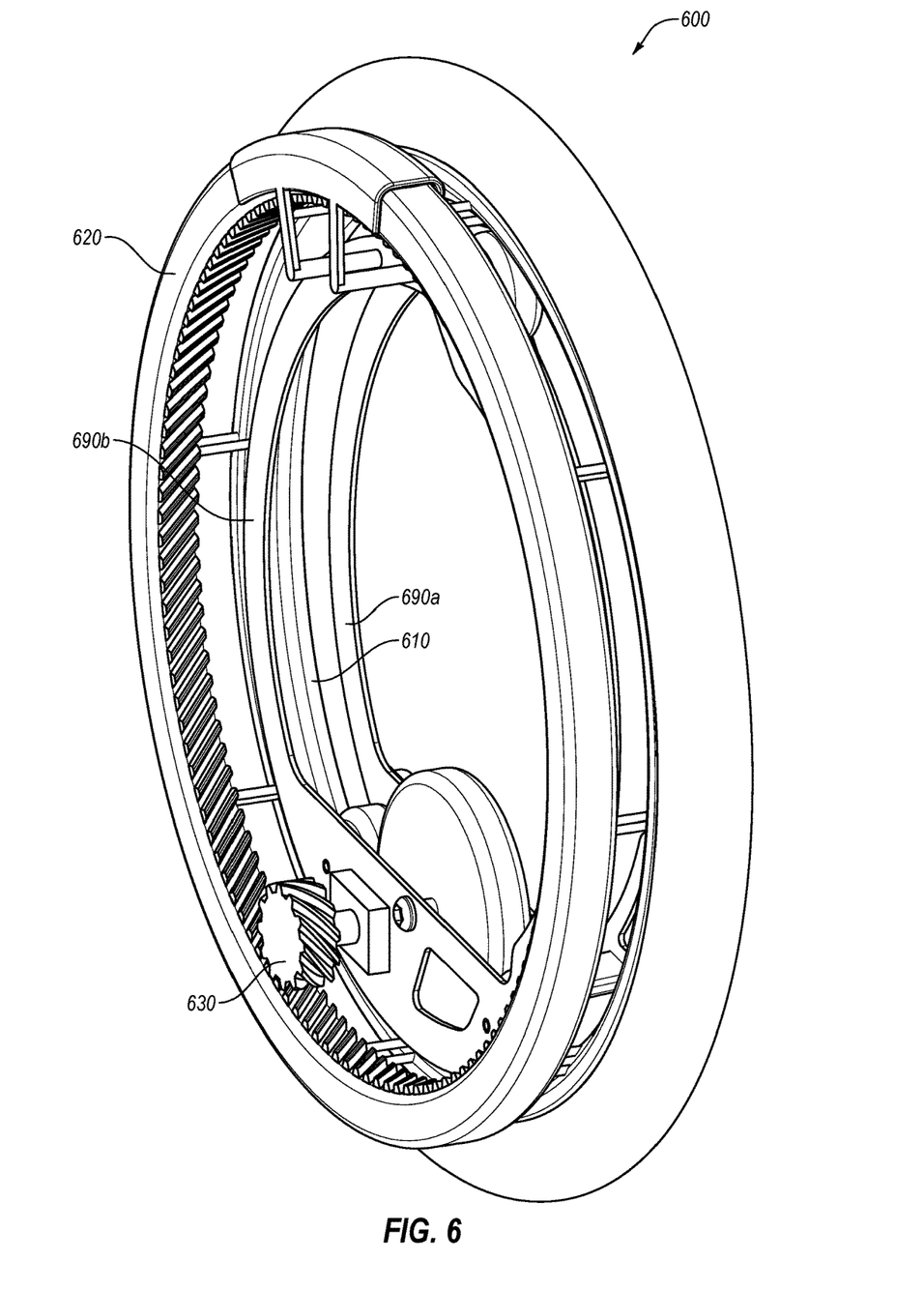
FIG. 6 illustrates a perspective view of an example wheel assembly.
Figure 7:
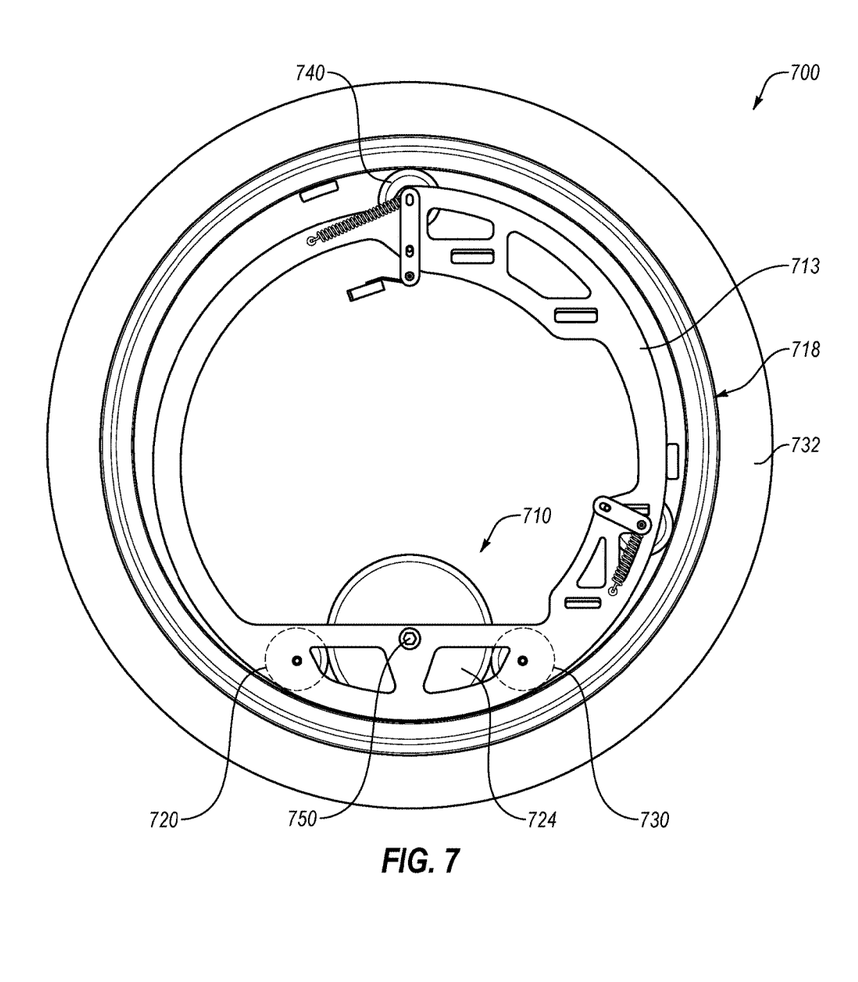
FIG. 7 illustrates a view of another example wheel assembly.

The first wheel 110 and the first drive gear 120 may interface in any suitable manner. For example, the first drive gear 120 may drive the first wheel 110 via a friction based drive (e.g., as illustrated in FIG. 7 and as described in U.S. application Ser. No. 15/146,729, which is incorporated by reference herein in its entirety). As another example, the first drive gear 120 may drive the first wheel 110 via a ring gear coupled to the rim of the first wheel 110 as illustrated in FIG. 6 and as described in U.S. application Ser. No. 15/336,559, which is incorporated by reference herein in its entirety.

In some embodiments, the vehicle 100 may include a third and fourth wheel that are similar and/or comparable to the first wheel 110 and/or the second wheel 130. For example, the vehicle 100 may include four wheels that operate as pairs and/or are each independently powered. In these and other embodiments, the back wheels of the vehicle 100 may have the same size drive gear and the front wheels of the vehicle 100 may have the same size drive gear different from the drive gear for the back wheels. For example, two "low gear" wheels may be at the rear of the vehicle 100 and two "high gear" wheels may be at the front of the vehicle 100. As another example, two "low gear" wheels may be located on one side of a four-wheeled vehicle and two "high gear" wheels may be located on the other side of the four-wheeled vehicle. Additionally or alternatively, each wheel may have a different drive gear size, effectively yielding a four speed transmission.

In some embodiments, one-way bearings may be coupled between the driving mechanism and the wheel for a lower geared wheel in a multi-wheel transmission. For example, the first wheel 110 may be coupled to the first motor 160 via one-way bearings. The one-way bearings may be oriented such that as the higher speed wheel (e.g., the second wheel 130) begins to overtake and go faster than the lower geared wheel (e.g., the first wheel 110), the first wheel 110 does not transition to a recharge state and begin to generate power at the first motor 160. In these and other embodiments, the higher speed wheel may avoid the additional resistance that may otherwise be encountered as the speed of the lower geared wheel transitions to the point that power begins to be generated at the lower geared motor.

Modifications, additions, or omissions may be made to FIG. 1 without departing from the scope of the present disclosure. For example, the vehicle 100 may include more or fewer elements than those illustrated and described in the present disclosure. For example, the vehicle 100 may take any form, and may include any number of wheels.

Figure 2:
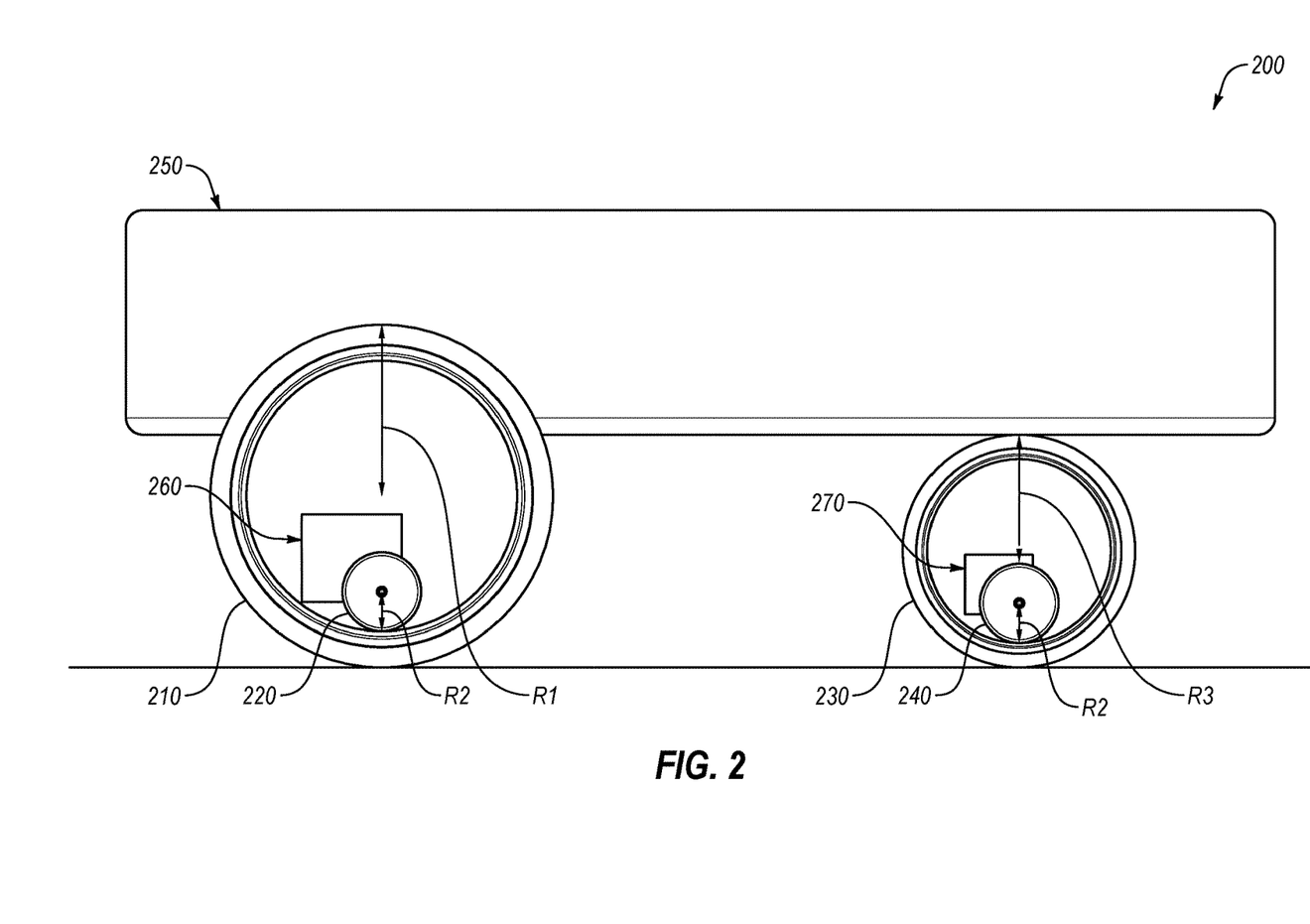
FIG. 2 illustrates a view of another example vehicle.

FIG. 2 illustrates a view of another example vehicle 200, in accordance with one or more embodiments of the present disclosure. The vehicle 200 may be similar or comparable to the vehicle 100 of FIG. 1, but with different sized wheels rather than different sized drive gears. For example, the vehicle 200 may include a first wheel 210 with a first drive gear 220 that may be similar or comparable (including size) to the first wheel 110 and the first drive gear 120 of FIG. 1. The vehicle 200 may additionally include a second wheel 230 and a second drive gear 240 that may be similar or comparable to the second wheel 130 and the second drive gear 140 of FIG. 1 (although different in size). Additionally or alternatively, the vehicle 200 may additionally include a first motor 260 and/or a second motor 270 that may be similar or comparable to the first motor 10 and second motor 170 of FIG. 1.

In some embodiments, the gearing ratio between the drive gear and the wheel may be varied by changing the size of the wheel rather than changing the size of the drive gear. For example, as illustrated in FIG. 2, the first wheel 210 may have a first radius R1 and the second wheel 230 may have a third radius R3 shorter than the first radius R1. Additionally or alternatively, the first drive gear 220 may have a second radius R2 and the second drive gear 240 may have the same second radius R2. Thus, the output force may vary as the gearing ratio varies.

For example, following the calculations above, the Output Force (F2) for the first wheel 210 may include $$F2 = T3 * \left(\frac{R1}{R2}\right) \Big/ R1$$

and the Output Force (F3) for the second wheel 230 may include $$F3 = T5 * \left(\frac{R3}{R2}\right) \Big/ R3$$

Modifications, additions, or omissions may be made to FIG. 2 without departing from the scope of the present disclosure. For example, the vehicle 200 may include more or fewer elements than those illustrated and described in the present disclosure. For example, the vehicle 200 may take any form, and may include any number of wheels.

Figure 3:
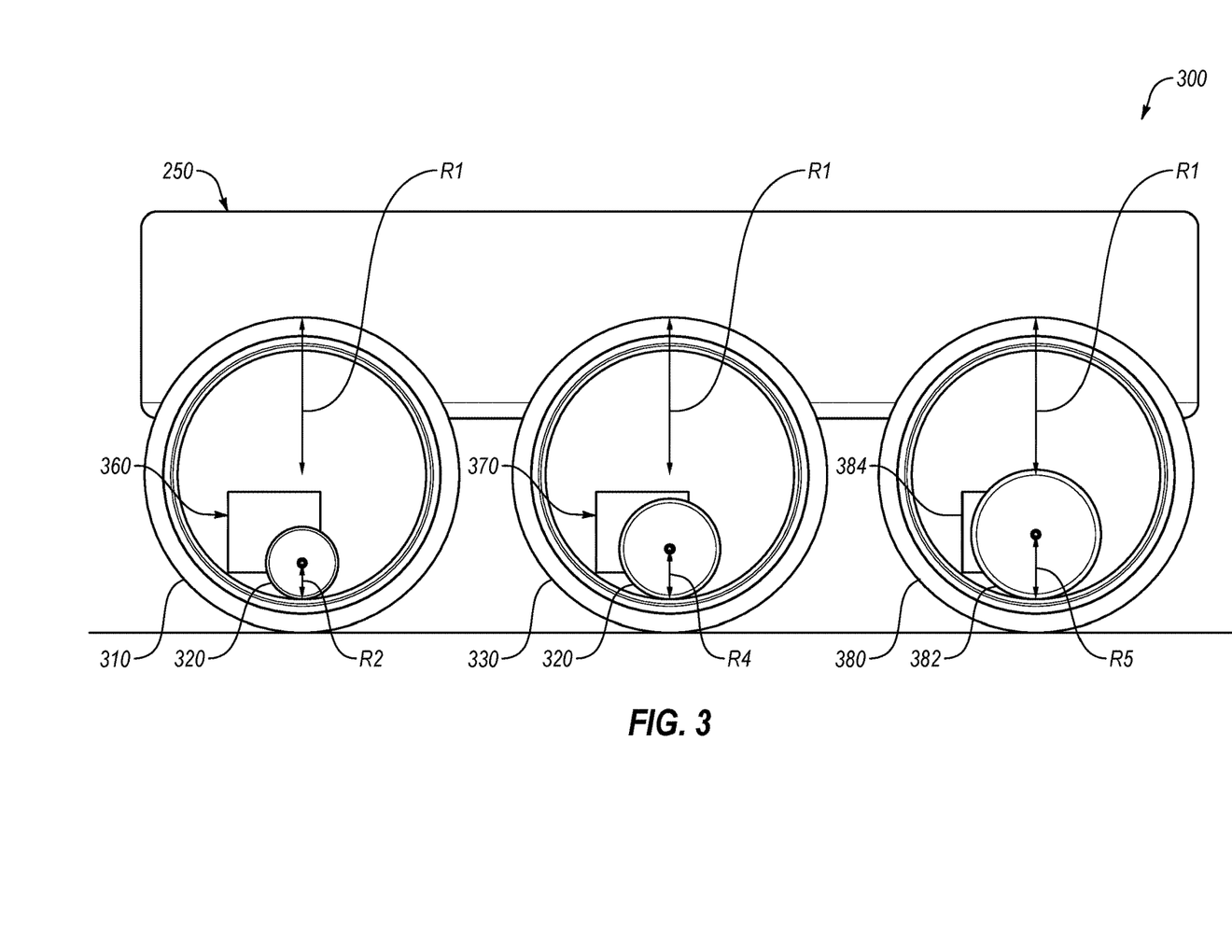
FIG. 3 illustrates a view of an additional example vehicle.

FIG. 3 illustrates a view of an additional example vehicle 300. The vehicle 300 may be similar or comparable to the vehicle 100 of FIG. 1, but with an additional wheel adding a third (or sixth) speed to the transmission. Such vehicles may include moon/Mars/space rovers, semi-truck tractors, etc. For example, the first wheel 310 and first drive gear 320 and the second wheel 330 and second drive gear 340 may be similar or comparable to the first wheel 110/first drive gear 120 and second wheel 130/second drive gear 140 of FIG. 1. The vehicle 300 may additionally include a third wheel 380. The third wheel 380 may include a third drive gear 382 with a larger radius (R5) than the other two wheels. The third wheel 380 may function as an even higher speed in the transmission than the second wheel 330. It will be appreciated that any number of wheels may be included such that any number of speeds may be included in the transmission. For example, the vehicle 300 may include four, six, eight, or more wheels. In some embodiments, an odd number of wheels may be included, for example, with a center wheel in the front, back, or middle of the vehicle 350.

The output force of the first wheel 310 and the second wheel 330 may be the same as those described above with respect to the first wheel 110 and the second wheel 130 of FIG. 1. The Output Force (F4) of the third wheel 380 may be represented by the torque (T6) at the third drive gear 382 multiplied by the gearing ratio of the third wheel 380 to the drive gear 382 divided by the radius of the third wheel 380.

$$F4 = T6 * \left(\frac{R1}{R5}\right) / R1$$

In some embodiments, the lowest and/or medium geared wheels of the vehicle 300 may be coupled to the respective motors via one-way bearings as described with reference to FIG. 1. For example, the lowest gear wheel may have one-way bearings and/or clutch bearings that may prevent the lowest gear wheel from generating power at the associated motor as the medium gear wheel and highest gear wheel gain speed. As the highest gear wheel continues to gain speed, the medium gear wheel may have one-way bearings and/or clutch bearings that may prevent the medium gear wheel from generating power at the associated motor.

Modifications, additions, or omissions may be made to FIG. 3 without departing from the scope of the present disclosure. For example, the vehicle 300 may include more or fewer elements than those illustrated and described in the present disclosure. For example, the vehicle 300 may take any form, and may include any number of wheels. As another example, the vehicle 300 may include one or more wheels on opposite sides of the vehicle 300.

Figure 4A:
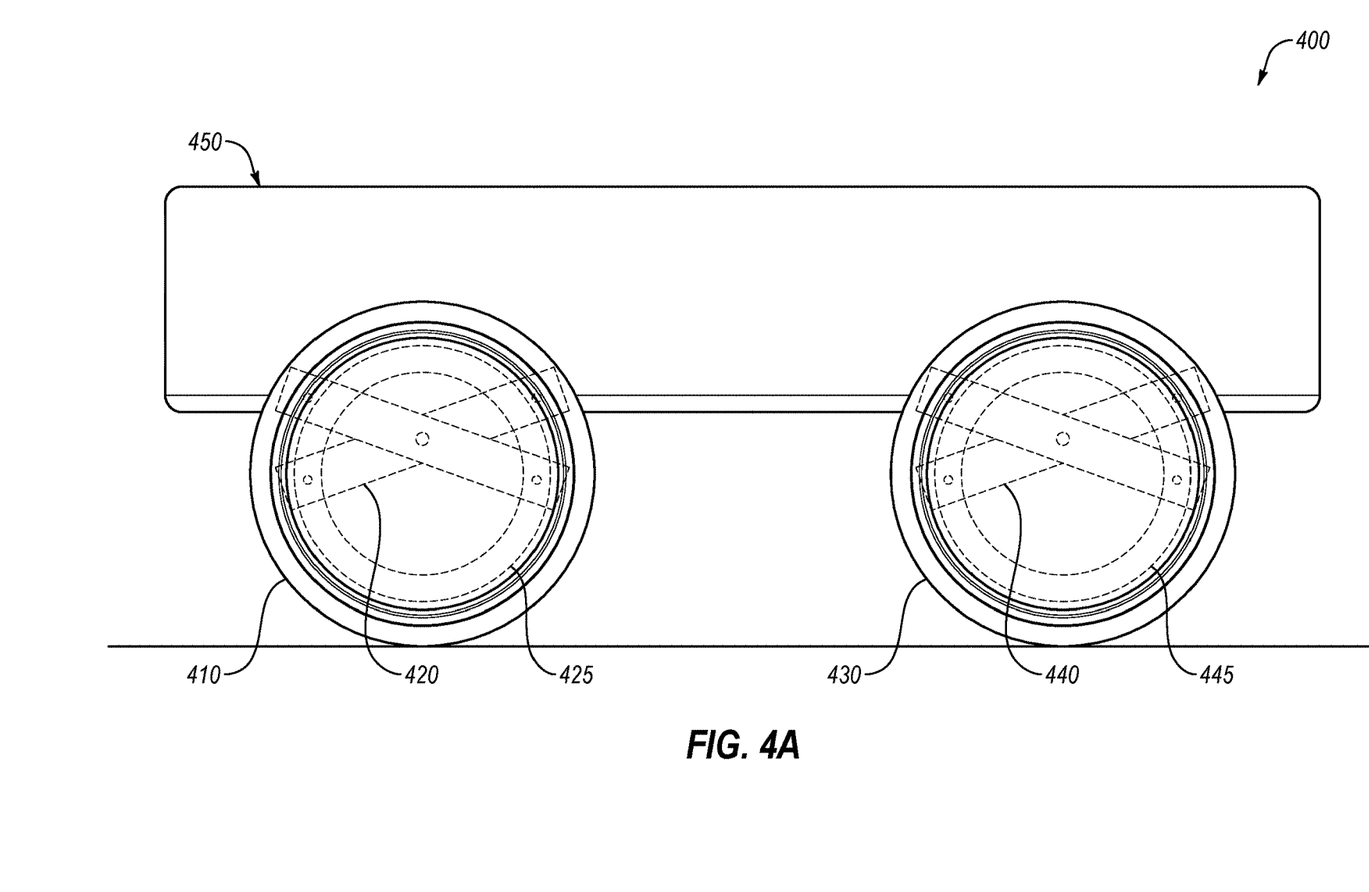
FIGS. 4A-4D illustrate various views of another example vehicle.
Figure 4B:
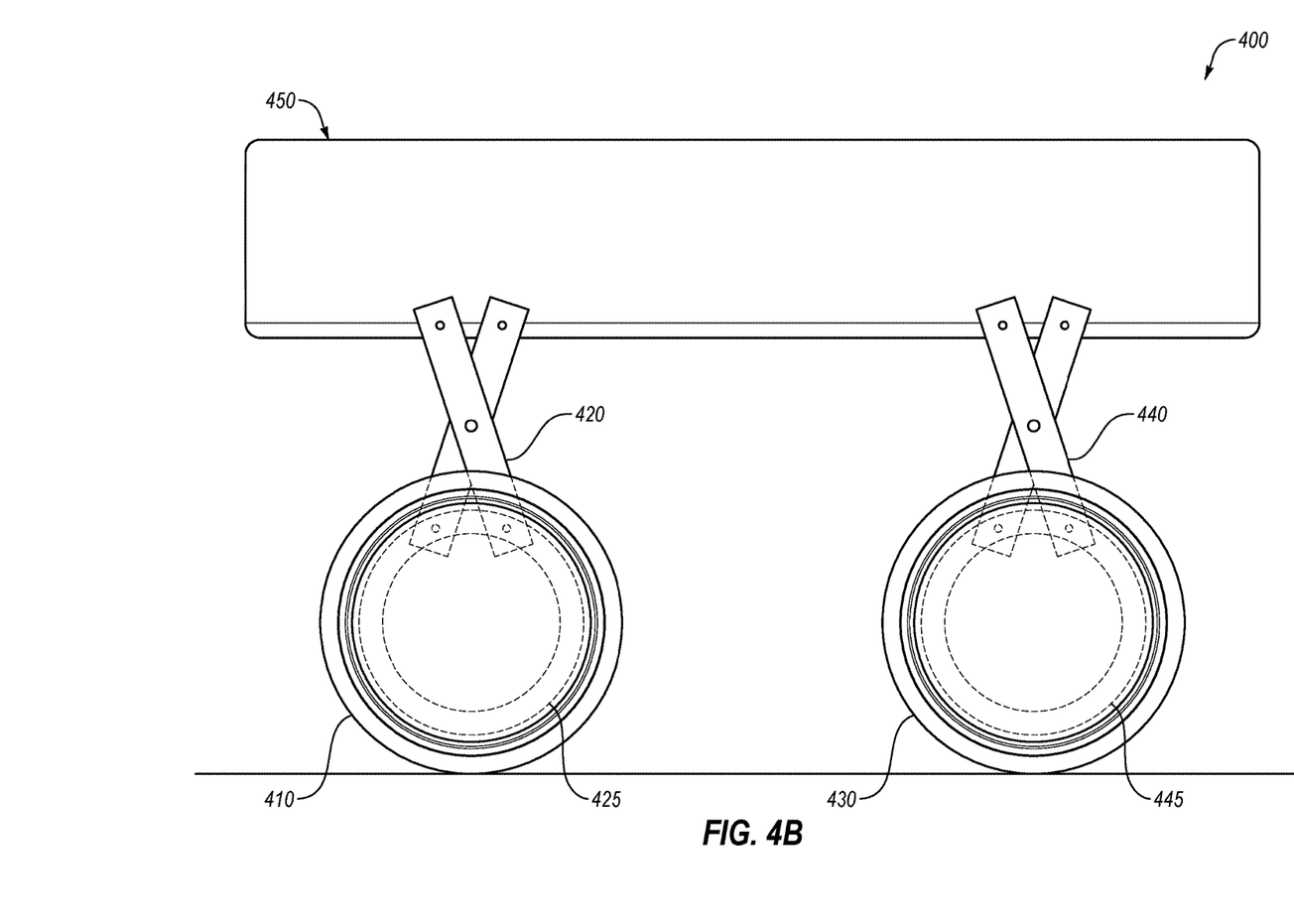
Figure 4C:
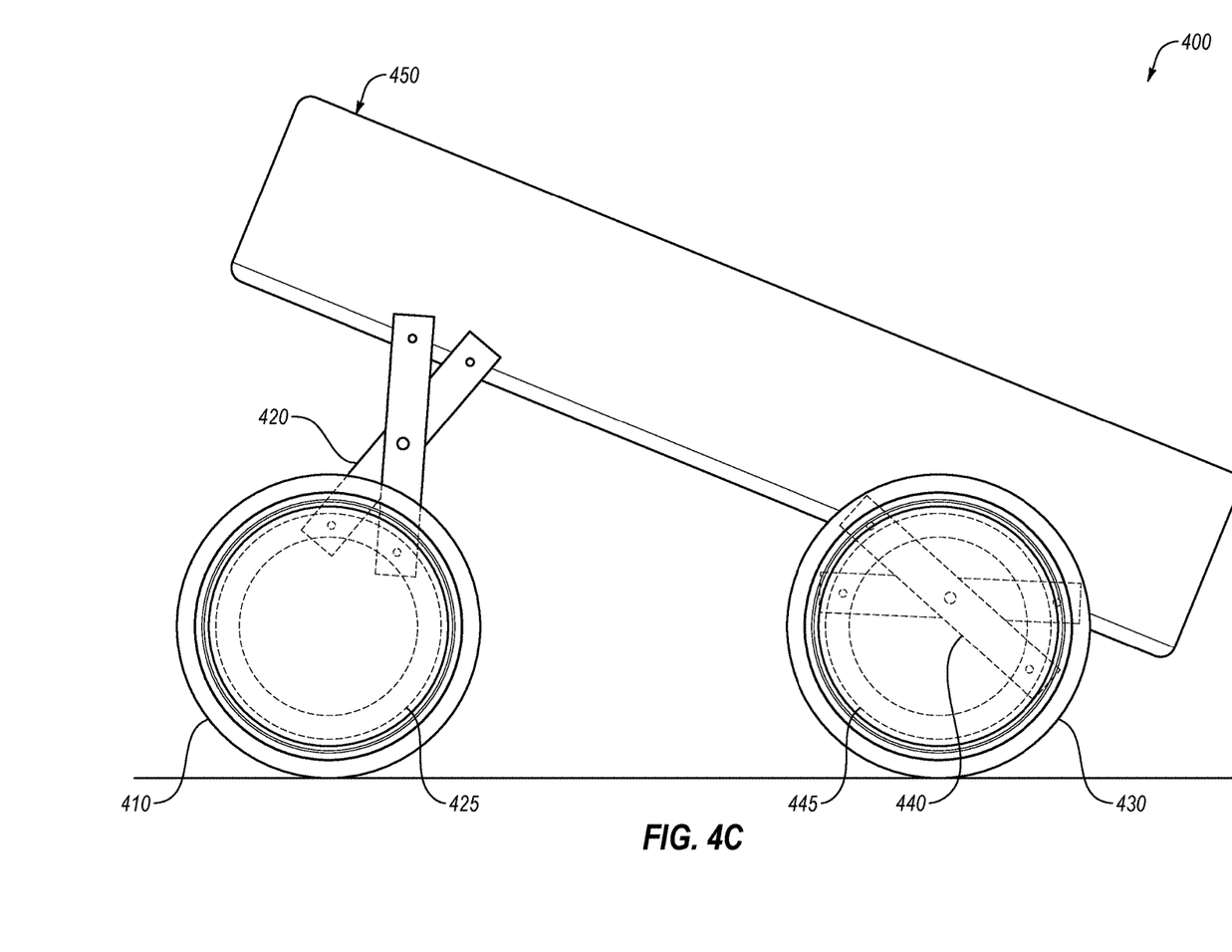
Figure 4D:
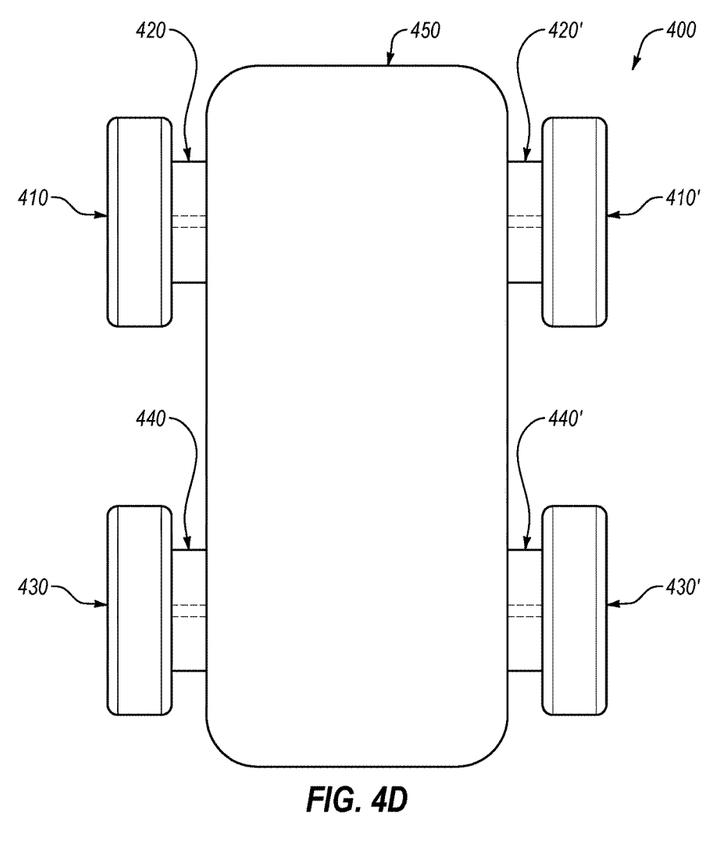

FIGS. 4A-4D illustrate various views of another example vehicle 400, in accordance with one or more embodiments of the present disclosure. FIG. 4A illustrates an example of the vehicle 400 with a body 450 of the vehicle 400 in a lowered position, and FIG. 4B illustrates the body 450 in an extended position. FIG. 4C illustrates an example of the body 450 with a mixed high/low position. FIG. 4D illustrates an alternative view of the vehicle 400 illustrating the location of scissor jacks relative to the body and the wheels.

As illustrated in FIG. 4A, the vehicle 400 may include a first wheel 410 with a first scissor lift 420 and a first exoskeleton plate 425. Additionally or alternatively, the vehicle 400 may include a second wheel 430 with a second scissor lift 440 and a second exoskeleton plate 445.

The first scissor lift 420 may be coupled on one end to the exoskeleton plate 420 and at the other end to a body 450 of the vehicle 450. The coupling may be rotatable and/or slidably coupled to the exoskeleton plate 420 and/or the body 450. As the scissor lift 420 is actuated, the upper portion of the scissor lift 420 may extend higher, bringing the body 450 higher relative to the wheel 410.

The scissor lift 420 may be actuated via a hydraulic device or any other displacing mechanism. Any other extending member may alternatively be used in place of the scissor lift 420 and remain within the scope of the present disclosure. For example, a hydraulic jack, an extending arm, a piston and chamber, a linear actuator, a screw-jack, etc. may be used to raise and lower the body 450 relative to the first wheel 410.

The first exoskeleton plate 425 may include any plate, ring, or other surface to support or otherwise suspend the tire and rim of the first wheel 410 as the tire and rim rotate about the first exoskeleton plate 425. For example, the first exoskeleton plate 425 may include one or more generally circular plates located proximate a centerless rim of the first wheel 410. The first exoskeleton plate 425 may support one or more roller guide assemblies. The roller guide assemblies may include a bridging shaft that spans between portions of the first exoskeleton plate 425 and functions as an axle for a roller guide of the roller guide assembly (e.g., by being fixed to each of the exoskeleton plates so the roller guide may rotate around the bridging shaft). The roller guide may be shaped and configured to roll along the centerless rim, either continually during use or under protective circumstances (e.g., when the centerless wheel assembly hits a pothole). In some embodiments, one or more of the roller guides may operate based on static friction between the roller guide and the centerless rim. Because the first exoskeleton plate 425 remains fixed relative to the body 450 while the first wheel 410 is rotating in motion, the first scissor lift 420 may be coupled to an inside face of the first exoskeleton plate 425 and remain operable while the vehicle 400 is in motion.

The preceding description, while described with respect to the first wheel, 410, the first scissor lift 420, and the first exoskeleton plate 425, is equally applicable to the second wheel 430, the second scissor lift 440, and the second exoskeleton plate 445.

As illustrated in FIG. 4B, the body 450 of the vehicle 400 may be raised relative to the first wheel 410 and the second wheel 430. Additionally, while illustrated as being raised above the height of the first wheel 410 and the second wheel 430, the body 450 may be lowered closer to the ground rather than being raised.

As illustrated in FIG. 4C, the first scissor jack 420 and the second scissor jack 440 may be independently operated such that the front and the back of the vehicle 400 may be raised and/or lowered independently.

As illustrated in FIG. 4D, the first scissor jack 420 may be disposed between the first wheel 410 and the body 450. In some embodiments, a suspension system or device may be disposed between the first wheel 410 and the body 450. For example, a trailing link, leading link, and/or swing arm may be disposed between the first wheel 410 and the body 450 such that the benefits of a suspension may be enjoyed without impeding the increased ground clearance. In these and other embodiments, such a suspension may include a linkage with one or more components mechanically coupled such that as the first wheel 410 interacts with an imperfection in the road or debris on the road, the body of the vehicle 400 is not displaced or disrupted.

The numerals of FIG. 4D with an apostrophe indicate elements on one side of the vehicle 400, which may be similar or comparable to the same numbered components without the apostrophe on the other side of the vehicle 400.

Modifications, additions, or omissions may be made to FIGS. 4A-4D without departing from the scope of the present disclosure. For example, the vehicle 400 may include more or fewer elements than those illustrated and described in the present disclosure. For example, the vehicle 400 may include fewer wheels than those illustrated.

Figure 5A:
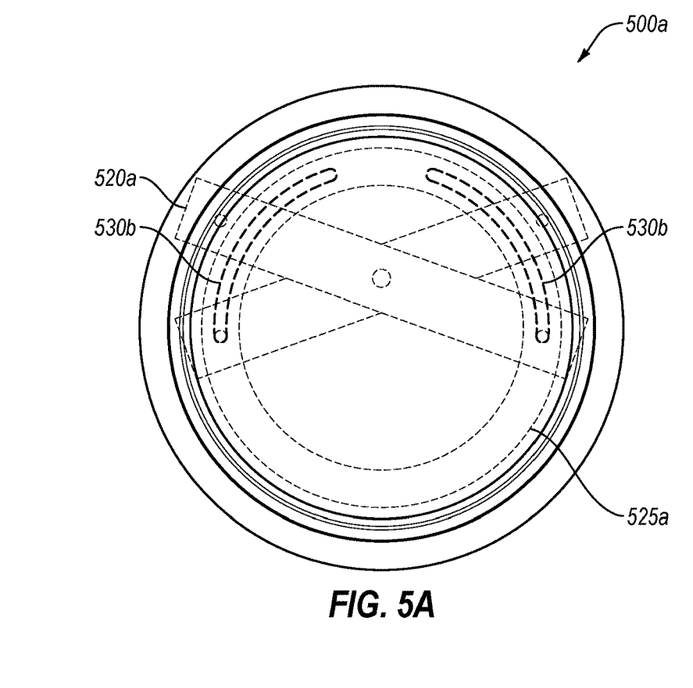
FIGS. 5A and 5B illustrate a view of an example wheel assembly.
Figure 5B:
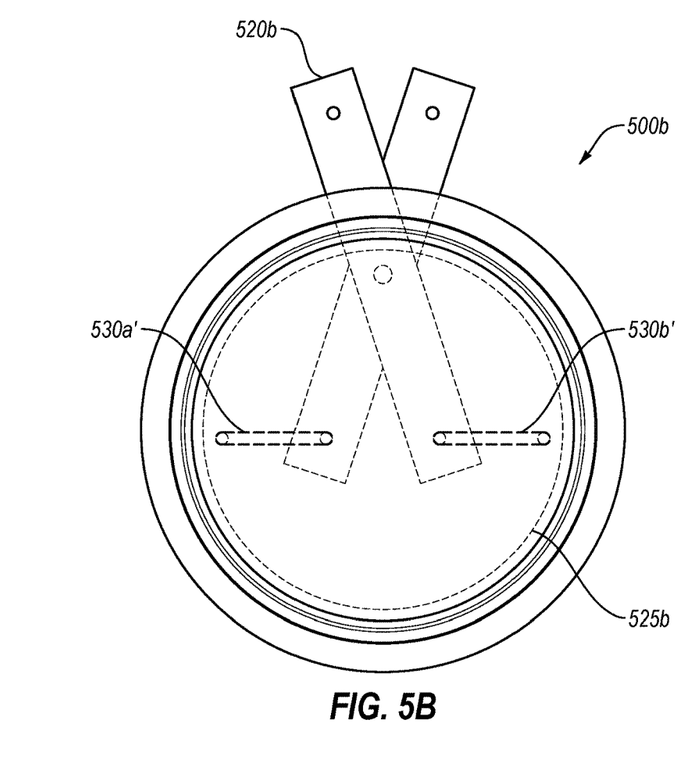

FIGS. 5A and 5B illustrate a view of an example wheel assembly 500*a* and 500*b*, respectively, in accordance with one or more embodiments of the present disclosure. The wheel 500*a* may be similar or comparable to the first wheel 410 of FIGS. 4A-4D. The wheel 500 (e.g., the wheel 500*a* and/or 500*b*) may include a scissor lift 520 (e.g., the scissor lifts 520*a* and/or 520*b*) and an exoskeleton plate 525 (e.g., the scissor lifts 525*a* and/or 525*b*). The scissor lift 520 and the exoskeleton plate 525 may be similar or comparable to the first scissor lift 420 and the first exoskeleton plate 425 of FIGS. 4A-4D.

The wheel 500*a* may include grooves 530*a* and 530*b* in the exoskeleton plate 525*a*. The grooves 530*a* and 530*b* may function as guides such that one end of the scissor jack 520*a* is coupled to the exoskeleton plate 525a via the grooves 530a and 530b. As the scissor jack 520a is actuated and the ends draw closer together, the grooves 530a and 530b may allow for the ends of the scissor jack 520a to remain coupled to the exoskeleton plate 525a as the scissor jack 520a compresses. In some embodiments, rollers or bearings may be included in the coupling of the scissor jack 520a to the exoskeleton plate 525a to facilitate the motion of the coupling through the grooves 530a and 530b.

FIG. 5B illustrates an alternative example of the grooves 530a' and 530b'. For example, as illustrated in FIG. 5B, the exoskeleton plate 525b may be a solid piece of material such that the grooves 530a' and 530b' may follow a straight path rather than a curvilinear path following the curve of the exoskeleton plate 525b. It will be appreciated that these are examples, and the grooves 530a' and 530b' may follow any trajectory and the exoskeleton plate 525b may be any size and/or have or not have a void in material.

In some embodiments, the scissor jack 520 may include a multi-component linkage. In these and other embodiments, the scissor jack 520 may be rotatably and not slidably coupled to the exoskeleton plate 525 and/or the body of the vehicle. In such embodiments, displacement as the scissor jack 530 raises or lowers the body may occur in the other components of the linkage.

Modifications, additions, or omissions may be made to FIGS. 5A-5B without departing from the scope of the present disclosure. For example, the wheel assemblies 500a and 500b may include more or fewer elements than those illustrated and described in the present disclosure. For example, the grooves 530a and 530b may take any shape or form.

FIG. 6 illustrates a perspective view of an example wheel assembly 600, in accordance with one or more embodiments of the present disclosure. The wheel assembly 600 may include a centerless rim 610 and a ring gear 620 coupled to the centerless rim 610. The ring gear 620 may interface with a drive gear 630. The drive gear 630 may rotate and cause the ring gear 620 to rotate. Rotation of the ring gear 620 may cause a corresponding rotation of the centerless rim 610.

The centerless rim 610 may include any shape or profile. In addition to those illustrated in the present disclosure, a few additional example profiles of centerless rims are illustrated in U.S. application Ser. No. 15/146,729. In some embodiments, the centerless rim 610 may include a profile such that one or more roller guides may roll along the centerless rim 610. The roller guides may function to maintain the drive gear 630 and the ring gear 620 in consistent engagement such that the drive gear 630 may drive the ring gear 620.

The ring gear 620 may include teeth. Additionally or alternatively, the ring gear 620 may include sprockets, spurs, etc. In some embodiments, the teeth may run along the inner diameter of the ring gear 620. The ring gear 620 and/or the teeth may be implemented as a helical gear (left- or right-handed), a double helical gear, a spur gear, an internal ring gear, a face gear, a planetary gear, etc. In these and other embodiments, the teeth of the ring gear 620 may interface with teeth of the drive gear 630. The teeth and/or the drive gear 630 may be implemented in a similar manner as that described for the teeth and/or the ring gear 620, but may be implemented in a different manner.

In some embodiments, the ring gear 630 may be supported in whole or in part by one or more exoskeleton plates 690 (e.g., the exoskeleton plates 690a and 690b). The exoskeleton plates 690 may perform a similar or comparable function to those described in U.S. application Ser. Nos. 15/146,729 and/or 15/336,559.

In some embodiments the wheel 110 of FIG. 1 may be implemented as the tire and centerless rim 610 and the ring gear 620 and the drive gear 120 of FIG. 1 may be implemented as the drive gear 630.

Modifications, additions, or omissions may be made to FIG. 6 without departing from the scope of the present disclosure. For example, the wheel assembly 600 may include more or fewer elements than those illustrated and described in the present disclosure.

FIG. 7 illustrates a view of another example wheel assembly 700, in accordance with one or more embodiments of the present disclosure. The wheel assembly 700 may include a first roller guide assembly 710 that may be driven, a second roller guide assembly 720, a third roller guide assembly 730, and a fourth roller guide assembly 740. The wheel assembly 700 may also include a tire 732, a centerless rim 718, and an outside face exoskeleton plate 713.

The first roller guide assembly 710 may include a roller guide 724 shaped and sized to interface with and roll along the centerless rim 718. The first roller guide assembly 710 may also include a bridging shaft 750 that may function as an axle for the roller guide 724. The bridging shaft 750 may be keyed such that as the bridging shaft 750 is rotated, the roller guide 724 may also rotate a corresponding amount. The bridging shaft 750 may be coupled to a driving mechanism. In some embodiments, the first roller guide assembly 710 may include bearings and a key. In these and other embodiments, static friction between the roller guide 724 and the centerless rim 718 may cause rotation of the roller guide 724 to rotate the centerless rim 718 and thus drive the wheel assembly 700.

In some embodiments, the second and third roller guide assemblies 720, 730 may be configured to roll along the centerless rim 718 during normal operation. Such rolling may facilitate the first roller guide assembly 710 remaining in contact with the centerless rim 718. In some embodiments, the fourth roller guide assembly 740 may be spaced apart from an interior circumference or edge of the rim 718 by a gap. For example, there may be a gap of approximately at least one, two, three, four, five, ten, fifteen, etc. thousandths of an inch. The gap may be reduced or eliminated in response to the wheel assembly 700 experiencing a drop from an elevation and/or a compression due to a great force or impact such as, for example, an abrupt or sudden stop. The fourth roller guide assembly 740 may contact the centerless rim 718 in response to the drop and/or the compression, which may mitigate effects of the drop and/or the compression.

In some embodiments, using an analogy of the inside face of the wheel assembly 700 as a clock, the first roller guide 710 may be disposed at a six o'clock position, the second roller guide assembly 720 may be at a seven o'clock position, the third roller guide assembly 730 may be at a five o'clock position, and the fourth roller guide assembly 740 may be at a twelve o'clock position. In some embodiments, the second and third roller guide assemblies 720, 730 may be disposed generally symmetrically about the location of the first roller guide assembly 710. For example, an angle between the second roller guide assembly 720 and the third roller guide assembly 730 with reference to a center of the centerless rim 718 may include between ten degrees and one hundred and forty degrees and generally symmetric about the six o'clock position. In some embodiments, the first roller guide assembly 710 may be disposed at other locations, for example, between an eight o'clock position and a four o'clock position. Additionally or alternatively, the fourth roller guide assembly 740 may be disposed at other locations, for example, between a ten o'clock position and a two o'clock position.

Modifications, additions, or omissions may be made to FIG. 7 without departing from the scope of the present disclosure. For example, the wheel assembly 700 may include more or fewer elements than those illustrated and described in the present disclosure. For example, the wheel assembly 700 may include fewer roller guide assemblies (e.g., three instead of four) or additional roller guide assemblies. As another example, the roller guide assemblies may be located and/or spaced apart in any configuration about the wheel assembly 700 and proximate the centerless rim 718.

One or more embodiments of the present disclosure may include a transmission that includes a first wheel assembly. The first wheel assembly may include a first wheel, a first drive gear coupled to the first wheel such that driving the first drive gear causes a corresponding rotation of the first wheel, and a first motor coupled to the first drive gear to drive the first drive gear. The transmission may also include a second wheel assembly including a second wheel of a size within ten percent of the first wheel, and a second drive gear coupled to the second wheel such that driving the second drive gear causes a corresponding rotation of the second wheel, where the second drive gear may be a different size from the first drive gear by between approximately ten percent and two hundred percent. The second wheel assembly may also include a second motor coupled to the second drive gear to drive the second drive gear.

One or more of the devices (e.g., transmissions), methods, and/or systems of the present disclosure may include that the first drive gear drives the first wheel by driving a ring gear coupled to a rim of the first wheel.

One or more of the devices (e.g., transmissions), methods, and/or systems of the present disclosure may include that the first drive gear drives the first wheel via static friction between the first drive gear and a rim of the first wheel.

One or more of the devices (e.g., transmissions), methods, and/or systems of the present disclosure may include that the first motor is configured to rotate a first drive shaft at a first speed and the second motor is configured to rotate a second drive shaft at a second speed.

One or more of the devices (e.g., transmissions), methods, and/or systems of the present disclosure may include a third wheel assembly including a third wheel approximately the same size as the first wheel, a third drive gear coupled to the third wheel such that driving the third drive gear causes a corresponding rotation of the third wheel, and approximately the same size as the first drive gear, and a third motor coupled to the third drive gear to drive the third drive gear. One or more of the devices (e.g., transmissions), methods, and/or systems of the present disclosure may also include a fourth wheel assembly including a fourth wheel of a size within ten percent of the second wheel, a fourth drive gear coupled to the fourth wheel such that driving the fourth drive gear causes a corresponding rotation of the fourth wheel, the fourth drive gear approximately the same size as the second drive gear, and a fourth motor coupled to the fourth drive gear to drive the fourth drive gear.

One or more of the devices (e.g., transmissions), methods, and/or systems of the present disclosure may include the first wheel assembly and the third wheel assembly are on a first side of a vehicle and the second wheel assembly and the fourth wheel assembly are on a second side of the vehicle.

One or more of the devices (e.g., transmissions), methods, and/or systems of the present disclosure may include a fifth wheel assembly including a fifth wheel approximately the same size as the first wheel, a fifth drive gear coupled to the fifth wheel such that driving the fifth drive gear causes a corresponding rotation of the fifth wheel, and a size different from the first drive gear and the second drive gear, and a fifth motor coupled to the fifth drive gear to drive the fifth drive gear. One or more of the devices (e.g., transmissions), methods, and/or systems of the present disclosure may also include a sixth wheel assembly including a sixth wheel of a size within ten percent of the first wheel, a sixth drive gear coupled to the sixth wheel such that driving the sixth drive gear causes a corresponding rotation of the sixth wheel, the sixth drive gear approximately the same size as the fifth drive gear, and a sixth motor coupled to the sixth drive gear to drive the sixth drive gear.

One or more of the devices (e.g., transmissions), methods, and/or systems of the present disclosure may include a third wheel assembly including a third wheel approximately the same size as the first wheel, a third drive gear coupled to the third wheel such that driving the third drive gear causes a corresponding rotation of the third wheel, and a different size than the first drive gear and the second drive gear, and a third motor coupled to the third drive gear to drive the third drive gear. One or more of the devices (e.g., transmissions), methods, and/or systems of the present disclosure may also include a fourth wheel assembly including a fourth wheel of a size within ten percent of the second wheel, a fourth drive gear coupled to the fourth wheel such that driving the fourth drive gear causes a corresponding rotation of the fourth wheel, the fourth drive gear a different size than the first drive gear, the second drive gear, and the third drive gear, and a fourth motor coupled to the fourth drive gear to drive the fourth drive gear.

One or more of the devices (e.g., transmissions), methods, and/or systems of the present disclosure may include a first scissor-lift coupled between the first wheel assembly and a vehicle, and a second scissor-lift coupled between the second wheel assembly and the vehicle.

One or more of the devices (e.g., transmissions), methods, and/or systems of the present disclosure may include that the first wheel assembly further includes a track in an exoskeleton plate of the first wheel assembly such that as the first scissor-lift is actuated, an end portion of the scissor-lift follows the track.

One or more of the devices (e.g., transmissions), methods, and/or systems of the present disclosure may include that the track is curved.

One or more of the devices (e.g., transmissions), methods, and/or systems of the present disclosure may include a suspension device coupled between the first wheel assembly and the first scissor-lift.

One or more of the devices (e.g., transmissions), methods, and/or systems of the present disclosure may include that the suspension device includes one of a trailing link, a leading link, and a swing arm.

One or more of the devices (e.g., transmissions), methods, and/or systems of the present disclosure may include a hydraulic device to actuate the scissor-lift.

One or more embodiments of the present disclosure may include a transmission that includes a first wheel assembly. The first wheel assembly may include a first wheel, a first drive gear coupled to the first wheel such that driving the first drive gear causes a corresponding rotation of the first wheel, and a first motor coupled to the first drive gear to drive the first drive gear. The transmission may also include a second wheel assembly including a second wheel of a different size from the first wheel by between approximately ten percent and two hundred percent, and a second drive gear coupled to the second wheel such that driving the second drive gear causes a corresponding rotation of the second wheel, where the second drive gear is a size within ten percent of the first drive gear. The second wheel assembly may also include a second motor coupled to the second drive gear to drive the second drive gear.

One or more embodiments of the present disclosure may include a vehicle that includes a body configured to carry a load, and a first wheel assembly. The first wheel assembly may include a first wheel, a first drive gear coupled to the first wheel such that driving the first drive gear causes a corresponding rotation of the first wheel, and a first motor coupled to the first drive gear to drive the first drive gear. The vehicle may also include a second wheel assembly that includes a second wheel of a size within ten percent of the first wheel, a second drive gear coupled to the second wheel such that driving the second drive gear causes a corresponding rotation of the second wheel, the second drive gear a different size from the first drive gear by between approximately ten percent and two hundred percent, and a second motor coupled to the second drive gear to drive the second drive gear. The vehicle may additionally include a first scissor-lift coupled between the first wheel assembly and the body, and a second scissor-lift coupled between the second wheel assembly and the body.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A transmission comprising:
   a first wheel assembly including:
      a first wheel;
      a first drive gear coupled to the first wheel such that driving the first drive gear causes a corresponding rotation of the first wheel; and
      a first motor coupled to the first drive gear to drive the first drive gear;
   a second wheel assembly including:
      a second wheel of a size within ten percent of the first wheel;
      a second drive gear coupled to the second wheel such that driving the second drive gear causes a corresponding rotation of the second wheel, the second drive gear a different size from the first drive gear by between approximately ten percent and two hundred percent; and
      a second motor coupled to the second drive gear to drive the second drive gear; and
   a first scissor-life coupled between the first wheel assembly and a vehicle; and
   a second scissor-lift coupled between the first wheel assembly and the vehicle;
   wherein the first wheel assembly further comprises a track in an exoskeleton plate of the first wheel assembly such that as the first scissor-lift is actuated, an end portion of the first scissor-lift follows the track.

2. The transmission of claim 1, wherein the track is curved.

3. A transmission comprising:
   a first wheel assembly including:
      a first wheel;
      a first drive gear coupled to the first wheel such that driving the first drive gear causes a corresponding rotation of the first wheel; and
      a first motor coupled to the first drive gear to drive the first drive gear;
   a second wheel assembly including:
      a second wheel of a size within ten percent of the first wheel;
      a second drive gear coupled to the second wheel such that driving the second drive gear causes a corresponding rotation of the second wheel, the second drive gear a different size from the first drive gear by between approximately ten percent and two hundred percent; and
      a second motor coupled to the second drive gear to drive the second drive gear; and
   a first scissor-life coupled between the first wheel assembly and a vehicle; and
   a second scissor-lift coupled between the first wheel assembly and the vehicle; and a suspension device coupled between the first wheel assembly and the first scissor-lift.

4. The transmission of claim 3, wherein the suspension device includes one of a trailing link, a leading link, and a swing arm.

5. A transmission comprising:
a first wheel assembly including:
  a first wheel;
  a first drive gear coupled to the first wheel such that driving the first drive gear causes a corresponding rotation of the first wheel; and
  a first motor coupled to the first drive gear to drive the first drive gear;
a second wheel assembly including:
  a second wheel of a size within ten percent of the first wheel;
  a second drive gear coupled to the second wheel such that driving the second drive gear causes a corresponding rotation of the second wheel, the second drive gear a different size from the first drive gear by between approximately ten percent and two hundred percent; and
  a second motor coupled to the second drive gear to drive the second drive gear; and
a first scissor-life coupled between the first wheel assembly and a vehicle; and
a second scissor-lift coupled between the first wheel assembly and the vehicle; and
a hydraulic device to actuate the scissor-lift.

* * * * *